US010921984B2

(12) United States Patent
Gupta et al.

(10) Patent No.: US 10,921,984 B2
(45) Date of Patent: Feb. 16, 2021

(54) PROTECTION OF USER DATA IN DATA STORAGE DEVICES USING PREEMPTIVE HEALTH REPORTING

(71) Applicant: Western Digital Technologies, Inc., San Jose, CA (US)

(72) Inventors: Eshaan Gupta, Bengaluru (IN); Ashish Kumar, Bengaluru (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 120 days.

(21) Appl. No.: 15/997,459

(22) Filed: Jun. 4, 2018

(65) Prior Publication Data

US 2018/0364911 A1 Dec. 20, 2018

(30) Foreign Application Priority Data

Jun. 14, 2017 (IN) .............................. 201711020780

(51) Int. Cl.
*G06F 3/06* (2006.01)

(52) U.S. Cl.
CPC .......... *G06F 3/0604* (2013.01); *G06F 3/0622* (2013.01); *G06F 3/0632* (2013.01); *G06F 3/0653* (2013.01); *G06F 3/0679* (2013.01); *G06F 3/0688* (2013.01); *G06F 2212/2022* (2013.01)

(58) Field of Classification Search
CPC ...... G06F 3/0679; G06F 3/0688; G06F 3/064; G06F 3/061; G06F 3/0653; G06F 12/0246; G06F 2212/1036; G06F 3/0632; G06F 2212/1016; G06F 3/0614; G06F 3/0634; G06F 2212/2022; G06F 3/0649
See application file for complete search history.

(56) References Cited

U.S. PATENT DOCUMENTS

| 2008/0046649 | A1* | 2/2008 | Ito ........................ G11C 16/349 711/115 |
| 2011/0173378 | A1* | 7/2011 | Filor ..................... G06F 11/004 711/103 |
| 2013/0111298 | A1* | 5/2013 | Seroff ................... G06F 3/0614 714/758 |
| 2014/0164674 | A1* | 6/2014 | Verhaeghe .......... G06F 12/0246 711/102 |
| 2016/0018998 | A1* | 1/2016 | Mohan .................. G06F 3/0659 711/103 |
| 2016/0188245 | A1* | 6/2016 | Thadi Suryaprakash ................... G06F 1/3287 710/13 |
| 2018/0181454 | A1* | 6/2018 | Lin ........................ G06F 3/064 |

* cited by examiner

*Primary Examiner* — Reginald G Bragdon
*Assistant Examiner* — Thanh D Vo
(74) *Attorney, Agent, or Firm* — Loza; Gabriel Fitch

(57) ABSTRACT

A data storage device includes a nonvolatile memory module, a host communication interface, and control circuitry configured to execute an initialization process with a host system communicatively coupled to the data storage device via the host communication interface, and as part of the initialization process, provide health status information associated with the nonvolatile memory module to the host system using the host communication interface.

34 Claims, 6 Drawing Sheets

PROTECTION OF USER DATA IN DATA STORAGE DEVICES USING PREEMPTIVE HEALTH REPORTING

CROSS-REFERENCE TO RELATED APPLICATION(S)

This application claims priority under 35 U.S.C. § 119 to Indian patent application no. 201711020780, filed Jun. 14, 2017, the disclosure of which is hereby incorporated by reference in its entirety.

BACKGROUND

The present disclosure relates to data storage devices and systems. More particularly, the present disclosure relates to systems, devices, and methods for implementing data protection for solid-state memory.

SUMMARY

In some implementations, the present disclosure relates to a data storage device comprising a nonvolatile memory module, a host communication interface, and control circuitry. The control circuitry is configured to execute an initialization process with a host system communicatively coupled to the data storage device via the host communication interface, and, as part of the initialization process, provide health status information associated with the nonvolatile memory module to the host system using the host communication interface.

In some embodiments, the data storage device is a solid-state memory card device, the host communication interface comprises a plurality of contact pins configured to electrically couple to a physical connector of the host system, and the control circuitry is further configured to receive power from the host system using the one or more of the plurality of contact pins as part of the initialization process. The control circuitry may be further configured to enter reset as part of the initialization process.

The control circuitry may be further configured to, as part of the initialization process, receive a synchronization command from the host system, and, in response to the synchronization command, generate a response to the synchronization command including the health status information, wherein providing the health status information comprises sending the response to the synchronization command to the host system using the host communication interface. For example, the initialization process may conform to at least one of the MultiMediaCards (MMC) and Secure Digital (SD) standards. In some embodiments, the synchronization command is an ACMD41 command.

In some embodiments, the control circuitry is further configured to receive a reset command from the host system as part of the initialization process, and, in response to the reset command, enter an idle state. For example, the reset command may be a CMD0 command conforming to at least one of the MultiMediaCards (MMC) and Secure Digital (SD) standards. In some embodiments, the control circuitry is further configured to maintain the health status information in the nonvolatile memory module. The control circuitry may be further configured to maintain the health status information in one or more nonvolatile data registers.

The health status information may be embedded in one or more reserved fields of a response to a synchronization command received by the data storage device from the host system. For example, the response to the synchronization command may comprise a health status block comprising one or more of a write endurance flag, a read endurance flag, and a data retention flag. The response to the synchronization command may further comprise a health values block comprising one or more of a read health value and a write health value. In some embodiments, the read health value indicates a percentage read health remaining, and the write health value indicates a percentage of write health remaining.

In some implementations, the present disclosure relates to a method of managing data in a data storage device. The method comprises, by control circuitry of a data storage device, executing an initialization process with a host system communicatively coupled to the data storage device using a host communication interface, and as part of the initialization process, providing health status information associated with a nonvolatile memory module of the data storage device to the host system using the host communication interface.

The method may further comprise, as part of the initialization process, receiving a synchronization command from the host system, and in response to the synchronization command, determining a health status of the data storage device, wherein providing the health status information is performed in response to the synchronization command and is based on the determined health status of the data storage device. For example, the method may further comprise, in response to said determining the health status of the data storage device, implementing a data refreshing operation in the data storage device.

In some embodiments, the method further comprises, as part of the initialization process, receiving a synchronization command from the host system, and generating response to the synchronization command, the response to the synchronization command having the health status information embedded therein. For example, the health status information may comprise data indicating one or more of a data storage device identifier associated with the data storage device, write endurance data, read endurance data, and data retention capability data. In some embodiments, the health status information indicates a percentage of available health of the data storage device. The health status information may comprise data indicating one or more of read health status, write health status, read count, write count, program/erase (P/E) count, data retention time, temperature exposure, data retention history, and health history of the data storage device. In some embodiments, the health status information indicates that an end-of-life state of the data storage device has been reached, as well as a cause of failure of the data storage device.

In some implementations, the present disclosure relates to a computing device comprising a data storage interface configured to communicatively couple the computing device to a data storage device, and control circuitry. The control circuitry is configured to initiate an initialization process with the data storage device at least in part by sending a synchronization command to the data storage device using the data storage interface and receiving a response to the synchronization command from the data storage device using the data storage interface. The response to the synchronization command includes health status information.

The control circuitry may be further configured to decode the health status information, and determine a health status of the data storage device based on the health status information. The control circuitry may be further configured to implement preemptive data protection in the data storage device in response to the health status information. In some embodiments, the control circuitry is further configured to provide a notification to a user indicating the health status. In some embodiments, the control circuitry is further configured to determine that a write endurance indicator in the response to the synchronization command is set, and, in response to the write endurance indicator, cause data stored in the data storage device to be backed-up to a location external to the data storage device, wherein the write endurance indicator indicates whether write endurance of the data storage device is exceeded.

In some embodiments, the control circuitry is further configured to request a voltage profile of the data storage device as part of the initialization process. In some embodiments, the control circuitry is further configured to determine that a data retention indicator in the response to the synchronization command is set, and in response to the data retention indicator, implement dynamic read cases in the data storage device, wherein the data retention indicator indicates whether a data retention condition has been met.

In some implementations, the present disclosure relates to a method of managing data in a data storage device. The method comprises, by control circuitry of a host computing system communicatively coupled to a data storage device, initiating an initialization process with the data storage device. Initiating the initialization process comprises sending a synchronization command to the data storage device using a data storage interface, and receiving a response to the synchronization command from the data storage device using the data storage interface. The response to the synchronization command includes health status information.

The method may further comprise, as part of the initialization process, providing power to the data storage device, sending an idle state entry command to the data storage device, and sending a voltage profile command to the data storage device. In some embodiments, the method further comprises determining that the data storage device has reached an end-of-life state based on the health status information. The method may further comprise determining that a read endurance indicator is set in the response to the synchronization command, and in response to the determination that the read endurance indicator is set, providing a user notification indicating a health state of the data storage device.

In some implementations, the present disclosure relates to a data storage device comprising a nonvolatile memory module, a means for communicatively coupling to a host computing device, and means for executing an initialization process with the host computing device at least in part by receiving a synchronization command from the host computing device, generating a response to the synchronization command including health status information, and providing the response to the synchronization command to the host computing device using the means for communicatively coupling to the host computing device.

The means for communicatively coupling to the host computing device may comprise a plurality of pins configured to contact a plurality of respective contacts of the host computing device. The means for executing the initialization process may comprise a solid-state memory controller.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
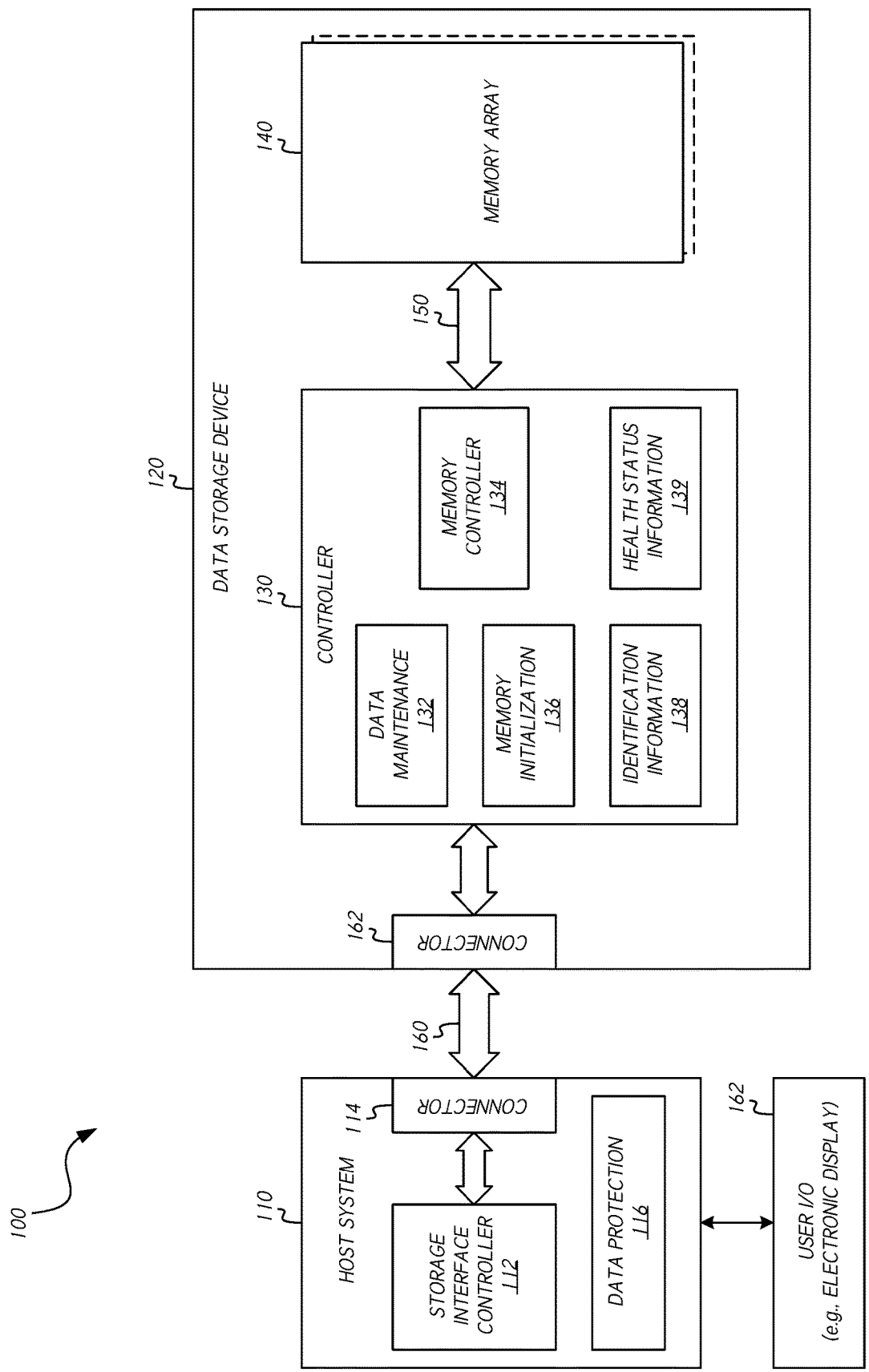
FIG. 1 is a block diagram illustrating an embodiment of a data storage system in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to data protection in solid-state memory systems and devices.

Overview

The present disclosure provides systems and methods for tracking and/or communicating health status information related to a data storage device, and further for protecting data stored in data storage devices based on health status information. Although certain embodiments are disclosed herein in the context memory card devices, it should be understood that the principles disclosed herein may be applicable in connection with any type of data storage device.

NAND flash memory, and other nonvolatile solid-state memory types, are widely used in solid-state data storage devices (e.g., flash memory cards). In certain solid-state memory devices/systems, the ability to correctly decode data written to solid-state memory cells may be adversely affected by retention-related charge loss (e.g., due to repeated program/erase (P/E) cycles) and/or read disturb charge gain. For example, in prolonged-storage applications, lack of data retention can lead to decoding failure. Furthermore, in relatively high-read utilization use cases, read disturb may lead to decoding failures. "Data retention," as used herein, may be understood according to its broad and ordinary meaning and may refer to the ability to recover data programmed in solid-state memory after a period of time. "Data retention period" may be used to refer to the period of time itself over which data may be stored in solid-state memory. "Retention related effects" may be used to refer to the loss or migration of charge in a programmed cell due to the passing of time, temperature, and/or other factors, over a data retention period.

Data retention may be understood as a measure of how long a solid-state memory cell can hold voltage, and therefor maintain its programmed state. Data loss due to charge loss in memory cells may occur when a memory cell is programmed and subsequently inactive for a prolonged period of time, particularly at elevated temperature. Such charge loss may generally be attributable to the dielectric associated with the solid-state memory cell being inherently leaky and at least somewhat prone to allowing electrons to escape the charge trap of the cell. Data retention charge loss may occur increasingly as the programming target voltage increases.

Data retention characteristics, along with endurance characteristics, may represent significant specification metrics for certain solid-state memory products. With regard to write and/or read endurance, solid-state storage devices generally have limited endurance characteristics, which may be characterized by a number of P/E cycles the solid-state media can accommodate over a period of time, or over the life of the device. Read and/or write endurance limits may be specified as a warranty condition by the device manufacturer. As a solid-state memory device is cycled, it may lose its data retention capabilities, thereby resulting in data loss. Generally, read disturb errors may be due at least in part to charge gain, wherein charge is added to cells during a read of the cell itself or neighboring cell(s), thereby causing the cell charge level to migrate from one voltage level/state to the next higher voltage state.

Data storage devices may be configured to maintain health state/status information. In some embodiments, the user/host of a data storage device is not informed of the health state of the media of the data storage device unless such information is specifically requested. For example, a host device or system may send a host-/vendor-specific command requesting the health status of a data storage device (e.g., memory card) to the data storage device. However, in certain embodiments, such a command does not return information indicating the primary cause or factor(s) contributing to the health state of the data storage device when the health state of the data storage device indicates, for example, an end-of-life state. The term "host" is used herein according to its broad and ordinary meaning, and may be used to refer to a host computing device and/or system, which may be electrically or communicatively coupled to a data storage device and serve as a host therefor.

In some implementations, the present disclosure relates to systems, devices, and/or methods for leveraging a mutual understanding between a host and a data storage device regarding communication to the host by the data storage device of health status information. The host may be configured to decode such information, and the host and/or data storage device may be configured to take preemptive measure(s) in response thereto. In some embodiments, the data storage device may be configured to return the status of the data storage media in connection with an initialization, or "handshaking," process between the data storage device and the host, which may allow for the host/user to be informed of the exact status of the data storage device when it is connected/coupled to the host.

The health status information may be provided by the data storage device in response to a synchronization command sent by the host during initialization. For example, with respect to memory card embodiments, the memory card may return health status information in response to, and/or embedded in, a response to an ACMD41 command. The synchronization command may be part of an initialization process and may request the voltage profile (e.g., the voltage levels supported by the data storage device), capacity profile (e.g., the maximum capacity of the data storage device), busy indicator, and/or other profiles or status information. The synchronization command (e.g., ACMD41) may be associated with reset of the data storage device.

Sending the health status of the data storage device (e.g., memory card) at every initialization process during host-device handshaking may reduce data vulnerability and/or provide other benefits. In certain embodiments, principles disclosed herein can allow for data to be preserved before the data storage device reaches an unrecoverable state. In certain embodiments, as the health status is returned to the host, the host is configured to decode and display health status information to the user, such that the user can take responsive action accordingly. In some implementations, health status tracking and/or reporting as presented herein provides improved failure analysis information communication, which may allow for the host/user to use the health status information returned by the data storage device to be used to determine the usage pattern associated with the particular data storage device, such as with respect to whether the usage of the data storage device was read-intensive or write-intensive. Knowledge of the usage pattern of the data storage device may advantageously allow for failure analysis to be performed only on relevant channels/lines. Although the principles disclosed herein are applicable to any type of data storage device, such principles may be particularly applicable to flash-based data storage devices, such as electrically-erasable programmable read-only memory (EEPROM) devices, USB flash drives, solid-state drives (SSD), serial flash devices (e.g., Serial Peripheral Interface Bus (SPI) flash), NAND and/or NOR flash devices, and others.

Particular aspects of the present disclosure are described herein with reference to the drawings provided herewith. In the present disclosure, common features may be designated by common reference numbers. It should be understood that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "exemplary" may indicate an example, an implementation, and/or an aspect, and should not be construed as limiting or as indicating a preference or a preferred example, implementation, and/or aspect.

Although certain embodiments are disclosed herein in the context of solid-state data storage devices and systems, it should be understood that certain features disclosed herein may be applicable devices/systems incorporating one or more other types of data storage, such as magnetic media, or other volatile or nonvolatile memory. As used in this application, "nonvolatile solid-state memory," "nonvolatile memory," "NVM," or variations thereof may refer to solid-state memory such as NAND flash. However, the systems and methods of this disclosure may also be useful in other hard drives and hybrid drives including both solid-state and disk components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (nonvolatile solid-state memory) chips. The nonvolatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Health-Status-Based Data Protection in Data Storage Systems

FIG. 1 is a block diagram illustrating an embodiment of a system 100 for implementing data protection features in accordance with one or more embodiments, the system 100 including a combination of a host system 110 and a data storage device 120. The data storage device 120 may be any type of data storage device, module, component, system, or the like, such as a memory card (e.g., Secure Digital (SD) card, microSD card). Furthermore, the terms "memory card," "SD card," "MMC card," "microSD card," "drive" and "data storage drive" may be used herein in certain contexts to refer to any type of data storage device, and may be used substantially interchangeably with the term "data storage device" in some contexts. For example, the terms "memory card," "SD card," "microSD card," and the like, may be used to refer to a data storage device, which may be embodied in a portable physical card having exposed pins for data communication with internal circuitry thereof, wherein the card may be configured to be inserted, or nested, in a receptacle associated with a housing of a host computing device, or the like.

The data storage device 120 includes a controller 130 and one or more memory arrays 140. The controller 130 (e.g., control circuitry) of the data storage device 120 (e.g., memory card, or any storage device utilizing solid-state memory) is configured to receive data commands from the host system 110, and to execute such commands in the memory array 140. The commands received and/or executed by the controller 130 may include, for example, read/write commands, and the like. The controller 130 may be configured to receive data commands from a storage interface (e.g., a device driver) 112 residing on the host system 110. With regard to memory card embodiments, the storage interface controller 112 may be configured to implement a particular SD Host Controller standard specification, which may enable the host 110 to access SD Devices such as SD Memory Cards, SDIO devices, SD Combo devices, or the like. The SD Protocol generally operates according to a master-slave communication model, employing a command-response mechanism. Such commands may generally be initiated by the host storage interface controller 112 and responded to by the data storage device 120. Certain embodiments disclosed herein provide for utilization of command responses by the data storage device 120 to communicate health status information associated with the memory array 140. In certain embodiments, the storage interface controller 112 is configured to synchronize signals to communicate between the data storage device interface 160 and the system bus of the host 110.

The controller 130 may communicate with the host system 110 over the communication channel 160 and receive initialization and/or data storage access commands using the communication channel 160. With respect to certain memory card embodiments, the channel 160 may provide an 8- or 9-pin bus consisting of one or more clock lines, bi-directional command lines, bi-directional data lines, and/or power lines. In certain embodiments, the channel 160 is designated to operate at a maximum operating frequency of, for example, 200 MHz, depending on the capabilities of the data storage device 120. In certain embodiments, data transfers to and/or from the data storage device 120 (e.g., memory card) are done in blocks, according to single- or multiple-block operations. Data may be transferable using single or multiple data lines. In certain embodiments, the data storage device 120 comprises a physical connector 162, which is configured to physically mate with a corresponding physical connector 114 of the host system 110. The connector 162 and/or connector 114 may provide a means for communicatively coupling the host system or computing device 110 to the data storage device 120. The connector 162 may comprise a physical shape and/or one or more pins configured to mate with a corresponding connector or receptacle, such as the connector 114, of the host system 110.

In certain embodiments, the memory array 140 comprises one or more blocks of solid-state data storage. Each block may comprise a plurality of pages, wherein a page may represent a smallest grouping of memory cells in the memory array 140 that can be programmed in a single operation or as a unit. Further, each page may include a plurality of code words, such as error-correcting pages, or the like.

The host 110 is configured to send data and commands to the data storage device 120 and to receive read data from the data storage device. For example, the host 110 may be configured to send data with write commands to cause the controller 130 to store the data in the memory array 140 at a specified address. The controller 130 may also be configured to implement data maintenance operations in the memory array 140, as directed by the data maintenance module 132. Data maintenance operation may include, for example, background scanning operations, write leveling, garbage collection operations, and/or wear leveling operations or other data reshuffling operations, etc.

The controller device or module 130 may comprise one or more processors, memory modules, as well as interconnect components for data and/or power communication. The various processor(s), busses, devices, chips, circuits, transistors, and/or other components may collectively, individually, or in one or more groupings, be considered control circuitry configured to implement the various functionality disclosed herein. The controller 130, which may be a solid-state memory controller in some embodiments, and/or control circuitry thereof may provide a means for executing an initialization process with the host system or device 110. In certain embodiments, the controller 130 comprises an embedded processor configured to execute firmware-level code for managing the functionality of the data storage device 120 at least in part. The controller 130 may comprise one or more data buses, and/or control circuitry for managing one or more memory arrays, including the memory array 140. In certain embodiments, the controller 130 is configured to communicate with the memory array 140 over an interface 150 conforming to a suitable communication protocol. The memory controller circuitry 134 may control communications between the controller 130 and the memory array 140 according to the relevant interface protocol.

The controller 130 may maintain certain data related to the data storage device. For example, data may be stored in one or more registers of the controller, wherein such information may provide identification information 138 associated with the data storage device 120 and/or memory array 140. The identification information 130 may comprise identification information used during an identification/initialization process or phase, such as a unique identification number. In certain embodiments, the identification information is stored in a register that is, for example, 128 bits wide. The identification information 130 may further comprise information indicating one or more of the following characteristics of the data storage device and/or memory array 140: write endurance, read endurance, data retention capability, or the like. The controller 130 may further be configured to maintain health status information 139, which may include health status (e.g., percentage of available health), including read health status and/or write health status. For example, the health status information 139 may indicate read count, write count, program/erase (P/E) count, data retention time and/or temperature data, data retention history, health history, or other types of health-status-related information.

With respect to memory card embodiments, the memory array 140 may advantageously comprise nonvolatile flash memory. The memory 140 may comprise electrically-erasable programmable read-only memory (EEPROM) cells. The interface 150 may be configured to couple the controller 130 to the memory array 140. In certain embodiments, commands and addresses are sent and received over the interface 150, and therefore relatively few pins may be required to implement communication between the memory array 140 and the controller 130. The data storage device 120 and memory array 140 may be used by the host 110 as a mass-storage device, rather than a randomly-addressable device.

Figure 2:
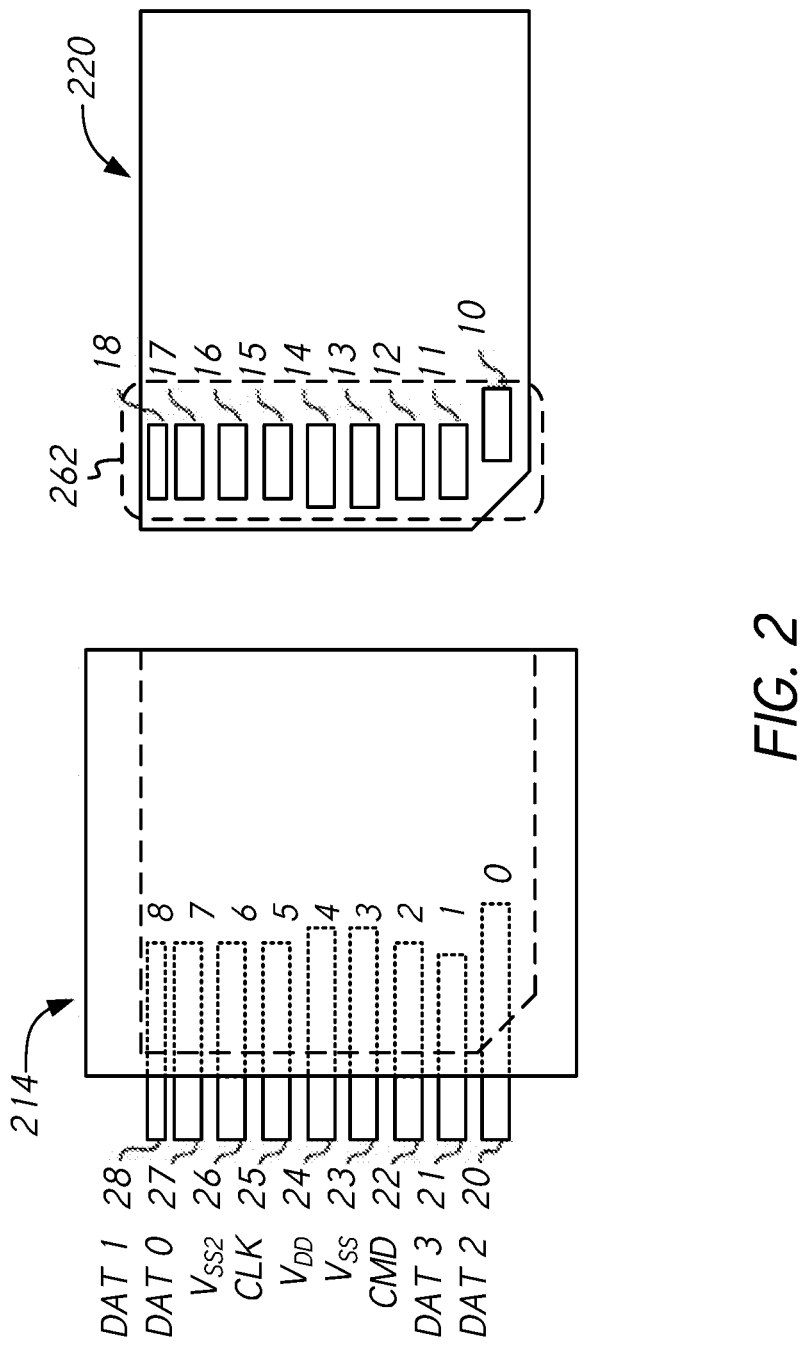
FIG. 2 is a diagram of a data storage connection system in accordance with one or more embodiments.

In some embodiments, the host 110 communicates with the data storage device using the Multi-Media Card (MMC) standard, or an extension thereof, such as Secure Digital (SD). FIG. 2 illustrates a data storage connection system demonstrating how a memory card 220 may physically couple to, and communicate with, a host connector 214. The memory card 220 may represent an embodiment of the data storage device 120 of FIG. 1. The memory card 220 may be any type of memory card. Although particular physical, mechanical, and electrical features are illustrated, the principles disclosed herein may be used in connection with devices having different physical, mechanical and/or electrical features or interfaces. Although certain embodiments are disclosed herein in the context of SD cards, it should be understood that the principles disclosed herein may be applicable to any type of memory card, such as memory cards conforming to standards of the International Organization for Standardization (ISO) and the International Electrotechnical Commission (IEC) (e.g., ISO/IEC 7816 standard).

As compared to MMC cards, SD cards may have a relatively greater thickness that accommodates an additional memory chip, and further may include additional data contacts in order to enable relatively faster data transfer between the card and a host. Generally, physical sockets designed to accept SD cards may also accept MMC cards, and electrical interfaces for communicating with SD cards may be at least partially backward compatible with MMC cards.

In certain embodiments, the memory card 220 includes a nonvolatile memory array and a processor-based controller configured to perform memory control and host interface functionality. The memory array (not shown) and processor-based controller (not shown) may be encapsulated within a housing of the card to provide protection for the internal components in different environments. Over the course of a memory card's operational life, certain conditions may cause the memory card to ultimately fail. The state of having arrived at a failure condition may be referred to herein as an "end-of-life" state, and the various conditions or factors that result in the memory card failure may be referred to as end-of-life problems or issues.

The memory card 220 may be configured to be inserted into a slot of a socket connector 214. The card 220 may include a row of electrical contacts (10-18) in a surface of the card and extending along one of its short edges. The socket connector 214 may include corresponding mating contact pins (0-8) connected to respective transmission paths (20-28). In certain embodiments, the card contact 12 is configured to serially receive command signals from a host and serially sends a response (e.g., status signals) to the host. The mating socket pin 2 may be connected to a command/response (CMD) line 22. Data may be received through one or more of the card contacts 10, 11, 17, 18 for storage in its nonvolatile memory, and data may be sent through the same contact(s) when read from the memory. The lines 20, 21, 27, 28, connected to the socket pins 0, 1, 7, 8, respectively, may be configured as a data (DAT) lines. In certain embodiments, the lines 20, 21, 22, 27, 28, along with a clock signal input (CLK) line 25 connected with the card contact 15 through the socket pin 5, may be configured to provide an interface with the host or other device or system for operating the memory system within the card 220. In certain embodiments, the card contacts 13, 14, 16 are configured to receive an operating voltage from the host, connected through respective socket pins 3, 4, 6 to the external lines 23 ($V_{SS}$), 24 ($V_{DD}$) and 26 ($V_{SS2}$).

Internally, the card 220 may comprise various components, which may be similar in certain respects to the components of the data storage device 120 of FIG. 1. Such internal components may include one or more of: an array of, for example, flash EEPROM cells; a controller; one or more busses; and/or one or more registers. In certain embodiments, write commands may be provided by the host to the memory card 220 through the CMD line 22, while data to be written may be sent through the DAT lines (e.g., 20, 21, 27, 28). After a commanded write operation is completed, the controller (not shown) of the memory card 220 may be configured to write a status indication associated therewith in a register that may be read by the host to confirm that the commanded operation has been completed. The memory card 220 may further comprise one or more registers for storing identification information and/or health status information. In SD card embodiments, the memory card 220 may utilize four lines for data communication.

Health Status Reporting Using Initialization Commands

As referenced above, certain embodiments of data storage systems may allow for explicit requesting of health status information using host-/vendor-specific commands. However, such commands may not return information indicating the cause of failure of the data storage device, and may not be generated automatically and thus require direct interaction/initiation by the host for the sole purpose of requesting health status information. For example, in response to a host-/vendor-specific command requesting health status information, the data storage device may respond with information relating to the maximum number of program cycles that the data storage device is predetermined to tolerate. The response may provide a percentage value indicating the actual number of cycles experienced by the device relative to the cycle limit. That is, some embodiments may provide a percentage value indicating the amount of the overall health used and/or remaining for the data storage device. Once 100% of the health (e.g., 'end-of-life') of the data storage device has been used, the reliability of the data may not be guaranteed by the manufacturer, for example. The response may generally not include information indicating the usage pattern of the data storage device that is attributable to the health status. In some implementations, the present disclosure relates to systems, devices, and/or methods for communicating health status information from a data storage device to a host automatically as part of an initialization operation between the data storage device and the host.

The term "initialization" is used herein according to its broad and ordinary meaning, and may refer to a process by which a host identifies, acknowledges, and/or recognizes a data storage device communicatively coupled thereto, and enables data communication between the host and the data storage device. For example, when a host bus/interface is operating and connection of a data storage device to the host is detected, the host device may initiate initialization of the data storage device by transmitting one or more commands to the data storage device. The initial stages of the initialization process may be considered a "handshake" between the data storage device and the host. In certain embodiments, the host provides power to the data storage device in connection with initialization. After power-up, the data storage device may enter an idle state, which may be performed in response to a command from the host (e.g., CMD0) or autonomously. In certain embodiments, a command instructing the data storage device to enter an idle/reset state may be a first command of an initialization process. Initialization between the host and the data storage device may be performed to determine/validate whether the host and the data storage device are compatible. In addition, initialization may allow the host to determine what kind of data storage device (e.g., memory card) the host is communicating with.

Initialization between a data storage device (e.g., memory card) and a host may further provide one or more additional commands, such as a command (e.g., CMD8) to determine if the data storage device is configured to support the supplied voltage. The host may issue the voltage command and verify voltage before the data storage device is initialized.

With regard to memory card initialization, communications may be performed on the CMD line. For example, the initialization process may begin by holding the CMD line high for a predetermined period (e.g., number of cycles). The card may then be reset by sending a reset command (e.g., CMD0), which causes the card to enter an idle state. The host may subsequently send its operating voltage range to the card using a voltage profile command (e.g., CMD8) to validate the interface condition. In certain embodiments, the card responds only if the operating voltage is valid for the card. If no response is received host, it may be determined that an operation condition mismatch exists between the host and the card. A received response may be validated in some way, such as by a cyclic redundancy check (CRC) and/or bit matching. Where the response is determined to be invalid, the card may be put into an inactive state.

Initialization of a data storage device (e.g., memory card) may further involve communication of a synchronization command, such as an ACMD41 command with respect to memory card embodiments. The synchronization command may provide the host a mechanism to identify and reject data storage devices or cards that do not match the voltage range (e.g., $V_{DD}$) desired by the host. When a response to the synchronization command is received, the host may check a busy bit/value in the response data field. If the busy bit/value indicates that the data storage device is busy, the synchronization command may be re-sent in a loop until the busy bit/value indicates that the data storage device is no longer busy. When the host receives a response to the synchronization command that indicates that the data storage device is not busy, it can be determined that the data storage device has completed its start-up operations; the handshake stage of the initialization process may then be deemed completed.

Figure 3:
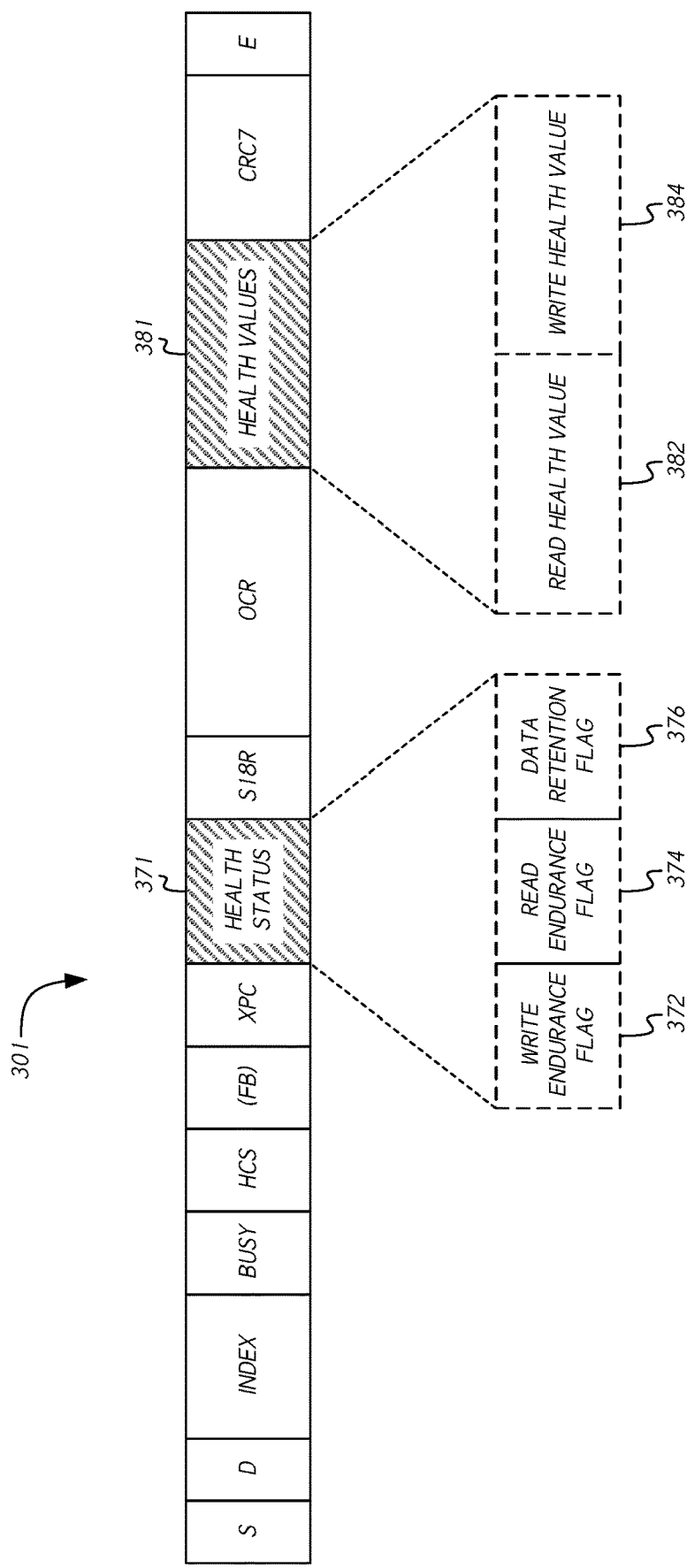
FIG. 3 is a block diagram illustrating a response to a synchronization command including health status information in accordance with one or more embodiments.

The content of the response to the synchronization command by the data storage device may indicate if the data storage device has compatible operation conditions. Embodiments disclosed herein further provide for including health-status-related information in the content of the response to a synchronization command. FIG. 3 is a block diagram illustrating a response to a synchronization command 301 including health status information according to one or more embodiments. For example, the synchronization command 301 may be an ACMD41 command. The ACMD41 command may be considered a synchronization command used to negotiate the operation voltage range of a data storage device (e.g., memory card) and/or to poll the data storage device until it has completed its power-up sequence. Although FIG. 3 is described in the context of an ACMD41 command, wherein reserved bits of the command are used to communicate health status information, it should be understood that the command 301 and the principles relating to health status information communication disclosed herein may be applicable to responses to any type of synchronization command, wherein reserved or otherwise available bits/fields of the command response are used to communicate health status information.

The diagram of FIG. 3 may be understood with reference to Table A, presented below, which provides an example response to a synchronization command in accordance with one or more embodiments:

TABLE A

| | Bits | | | | | | | | | | | | |
|---|---|---|---|---|---|---|---|---|---|---|---|---|---|
| | 47 | 46 | 45-40 | 39 | 38 | 37 | 36 | 35-33 | 32 | 31-16 | 15-08 | 07-01 | 00 |
| Field | S | D | Index | Busy 31 | HCS 30 | (FB) 29 | XPC 28 | Reserved 27-25 | S18R 24 | OCR 23-08 | Reserved 07-00 | CRC7 | E |
| Bit values | 0 | 1 | 101001 | 0 | x | 0 | x | 000 | x | xxxxh | 00000000 | xxxxxxxb | 1 |
| # of bits | 1 | 1 | 6 | 1 | 1 | 1 | 1 | 3 | 1 | 16 | 8 | 7 | 1 |

The response 301 may include a value indicating whether the data storage device (e.g., memory card) is a high-capacity card. The 'HCS' field of the response 301 may comprise host capacity support information. In certain embodiments, the 'OCR' field may comprise information stored in an operating condition register of the data storage device. The 'XPC' field may be used to control the maximum current in the default speed mode of the data storage device. For example, in one embodiment, an XPC value of '0' may correspond to a maximum current of 100 mA, while a value of '1' may correspond to a maximum current of 150 mA. The 'CRC7' field may comprise a checksum of a data storage device identification number (e.g., card identification number (CID) for memory card embodiments), which may be stored in a register.

As shown in FIG. 3, the response 301 to the synchronization command may include health status information in one or more reserved fields. For example, the response 301 may include health status information 371, which may comprise fields/bits used to indicate data storage health related to write endurance, read endurance, and data retention, respectively. In some embodiments relating to a response to an ACMD41 command, the data storage device may use reserved bits 33-35 and/or 8-15 (see Table A) for health-status-related data. In certain embodiments, the health status block 371 includes a write endurance flag or value 372 (e.g., single bit), which may be set (e.g., bit value of '1,' or '0') by the data storage device when the data storage device exceeds a write endurance limit. In certain embodiments, the health status block 371 includes a read endurance flag or value 374 (e.g., single bit), which may be set (e.g., bit value of '1,' or '0') by the data storage device when the data storage device exceeds a read endurance limit.

In certain embodiments, the health status block 371 includes a data retention flag or value 372 (e.g., single bit), which may be set (e.g., bit value of '1,' or '0') by the data storage device when a data-retention-related condition is met in the data storage device. For example, in certain embodiments of solid-state data storage devices, when a data-retention-related problem arises with respect to the data storage media, dynamic read cases may be implemented to improve data integrity. Where dynamic read cases have been implemented, or other data retention compensation action has been taken, the flag/value 376 may be set or otherwise used to indicate that data retention issues are present. For example, as described above, data stored in solid-state (e.g., flash) storage systems can be susceptible to charge loss over time, causing the distribution of thresholds to degrade. To be able to successfully extract the data content in such cases, in certain implementations, the controller of the data storage device may shift the voltage read levels using margined reference levels as part of a dynamic read process. Dynamic read cases may be implemented in various ways, such as by shifting read levels are shifted until, with the use of ECC, the data can be extracted. The shifted read levels used for dynamic read may determined by the controller during the course of operation or may be based on a set of values pre-loaded in the data storage device for this purpose. These levels can also be used in a number of ways, such as only being used when the data is otherwise not readable (or has a high error rate), or may be used for normal read operations as needed. The data storage device may track when dynamic read cases have been used to decode data stored in the data storage media, and provide an indication in the response to the synchronization command regarding the dynamic read cases status.

In some implementations, the host may receive data from the data storage device that indicates specific/exact health values. For example, a plurality of bits may be used to indicate one or more of read health and write health. In some embodiments, out of a set of bits of the health values block 381 (e.g., 8 bits; bits 8-15), a subset of the bits (e.g., 4 bits; bits 12-15) may correspond to the read endurance health percentage, while the remaining subset of bits may correspond to write endurance health percentage, or vice versa.

Table B, presented below, provides an example of a health values block in a response to a synchronization command according to one or more embodiments:

TABLE B

| 15 | 14 | 13 | 12 | 11 | 10 | 9 | 8 |
|---|---|---|---|---|---|---|---|
| % Read Health | | | | % Write Health | | | |

Table B may correspond to the health values block 381 of FIG. 3. The embodiment of Table B may provide a mechanism for implementing health status reporting using bits 8-15 of an ACMD41 response.

As described above, solid-state memories (e.g., flash) may generally be capable of supporting only a certain number of reads/writes. For health status calculations, according to certain embodiments, a data storage device is configured to track the of number of read commands received and/or program erase (P/E) cycle counts (i.e., "hot counts"). In certain embodiments, health status values are calculated using, or based on, the following formulae:

$$\% \text{ Read Health Status} = \frac{\text{Total Block Read Commands}}{\text{Maximum Block Read Endurance}} \times 100 \quad (1)$$

$$\% \text{ Write Health Status} = \frac{\text{Average Hot Count}}{\text{Maximum Write Endurance}} \times 100 \quad (2)$$

In embodiments using 4-bit values for health percentages, a maximum of 16 unique values may be used, and therefore the granularity of the health percentage value may be limited to 16 discrete values/increments. In certain embodiments, the number of discreet values used for health percentage value may be further limited to 10 steps, wherein each of the ten steps/values corresponds to a different range of percentages. Table C, presented below, provides an example embodiment of correspondences between 4-bit values and percentage ranges:

TABLE C

| Value | % Range |
|---|---|
| 0000 | 0-10% |
| 0001 | 10-20% |
| 0010 | 20-30% |
| 0011 | 30-40% |
| 0100 | 40-50% |
| 0101 | 50-60% |
| 0110 | 60-70% |
| 0111 | 70-80% |
| 1000 | 80-90% |
| 1001 | 90-100% |

Although a particular coding scheme is shown in Table C, it should be understood that health values according to embodiments of the present disclosure may be implemented using any desirable coding scheme, as well as any desirable or practical number of health value ranges or bits. The embodiments described in connection with FIG. 3 and Tables A-C may advantageously allow for improved data protection through increased health status information communication. In certain embodiments, health status information may be communicated by the data storage device to the host in association with every initialization process during host-device handshaking in order to further reduce data vulnerability.

Processes for Protecting Data Using Health Status Information

Various embodiments are disclosed herein for communicating health status information between a host and data storage device. By providing health status information to the host during device initialization, embodiments disclosed herein may allow for user data stored on a data storage device to be preserved prior to the data storage device reaching an unrecoverable state. When health status information is returned to the host in connection with an initialization process, the host may advantageously decode the health status information and/or display notifications related thereto to a user, such that the user can take responsive action accordingly. Systems, devices, and methods as disclosed herein can provide improved information for failure analysis of data storage devices. For example, health status information returned in connection with an initialization process may be used to determine the kind of usage pattern experienced by a data storage device (e.g. memory card), such as whether the usage of the device was primarily read-intensive or write-intensive. Failure analysis may advantageously be focused on the determined usage pattern. Although certain aspects of the process described below, as well as aspects of other embodiments disclosed herein, are presented in the context of memory cards, it should be understood that principles of health status communication in accordance with the present disclosure may be applicable to any type of data storage device, such as any type of flash-based data storage device or technology.

Figure 4:
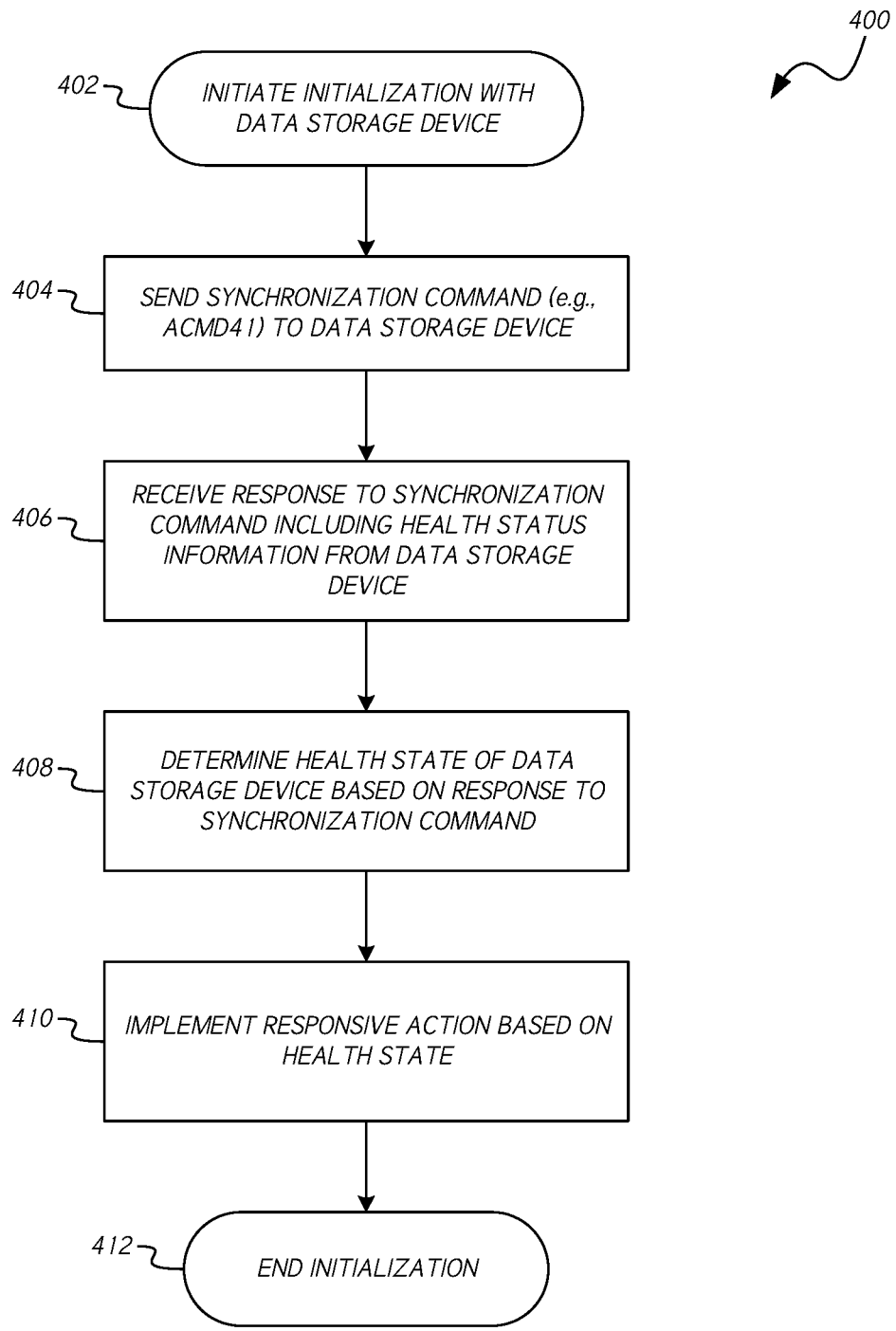
FIG. 4 is a flow diagram illustrating a process for implementing user data protection based on health status information in accordance with one or more embodiments.

FIG. 4 is a flow diagram illustrating a process 400 for implementing user data protection based on health status information in accordance with one or more embodiments of the present disclosure. One or more of the steps/blocks of the process 400 may be implemented or performed at least in part by a host computing system, such as by control circuitry of a host computing system. For example, the process 400 may be performed at least in part by the host system 110 of FIG. 1, described in detail above. At block 402, the process 400 involves initiating an initialization sub-process between a host system and a data storage device communicatively coupled to the host system. For example, when the data storage device is coupled to the host (e.g., when a memory card is inserted in a host connector), power may be supplied to the data storage device by the host (e.g., via a connection pin for a memory card embodiment). The data storage device may enter an idle state in response to an idle state entry command from the host (e.g., CMD0).

At block 404, the process 400 involves sending a synchronization command to the data storage device. For example, when the data storage device (e.g., memory card) is in an idle/reset state, in order to initialize the data storage device, the host may transmit a synchronization command (e.g., ACMD41) requesting a voltage profile of the data storage device (e.g., via a command pin CMD of a memory card).

At block 406, the process 400 involves receiving a response to the synchronization command from the data storage device, wherein the response includes health status information embedded in one or more bits/fields of the response. For example, the health status information may be contained in one or more reserved fields/bits of the response, depending on the relevant initialization protocol for the particular type of data storage device.

At block 408, the process 400 involves determining the health state or status of the data storage device, or associated solid-state media, based on the response to the synchronization command. The health state or status may be determined at least in part by decoding the health status fields/bits of the response. The health status information of the synchronization command response may indicate whether the data storage device has reached an end-of-life state and/or what the cause of such state is/was.

At block 410, the process 400 involves implementing responsive action based on the health state or status of the data storage device or associated media. For example, block 410 may involve taking a backup of all or a portion of data stored in the data storage device to a location external to the data storage device. With regard to read endurance issues, as indicated by the health status information, the data storage device may still have write endurance capability even when read endurance has been exceeded. Therefore, reprogramming the data to another location in the data storage device may at least partially alleviate the read endurance issues with respect to the data at issue. Where the health status information indicates that the write endurance of the data storage device has been exceeded, the process 400 may effectively be terminated once any data that is desired to be backed-up has been backed-up or read from the data storage device.

The responsive action may involve reshuffling of data within the data storage device when write endurance has not yet been exceeded. For reshuffling operations responsive to the health status of the data storage device are required or desired, such operations may be performed internally by the data storage device in order to resolve the relevant health issues. That is, the response to the synchronization command from the data storage device to the host may inform the host that the card is suffering from read endurance or data retention issues, but that the data storage device will take steps internally to resolve such issues. Therefore, for subsequent initialization process(es), the health issues may no longer be indicated in the response to the synchronization command. In certain embodiments, the health status may be displayed to the user if the data storage device is as or approaching an end-of-life state. At block 412, the initialization process is completed.

Figure 5:
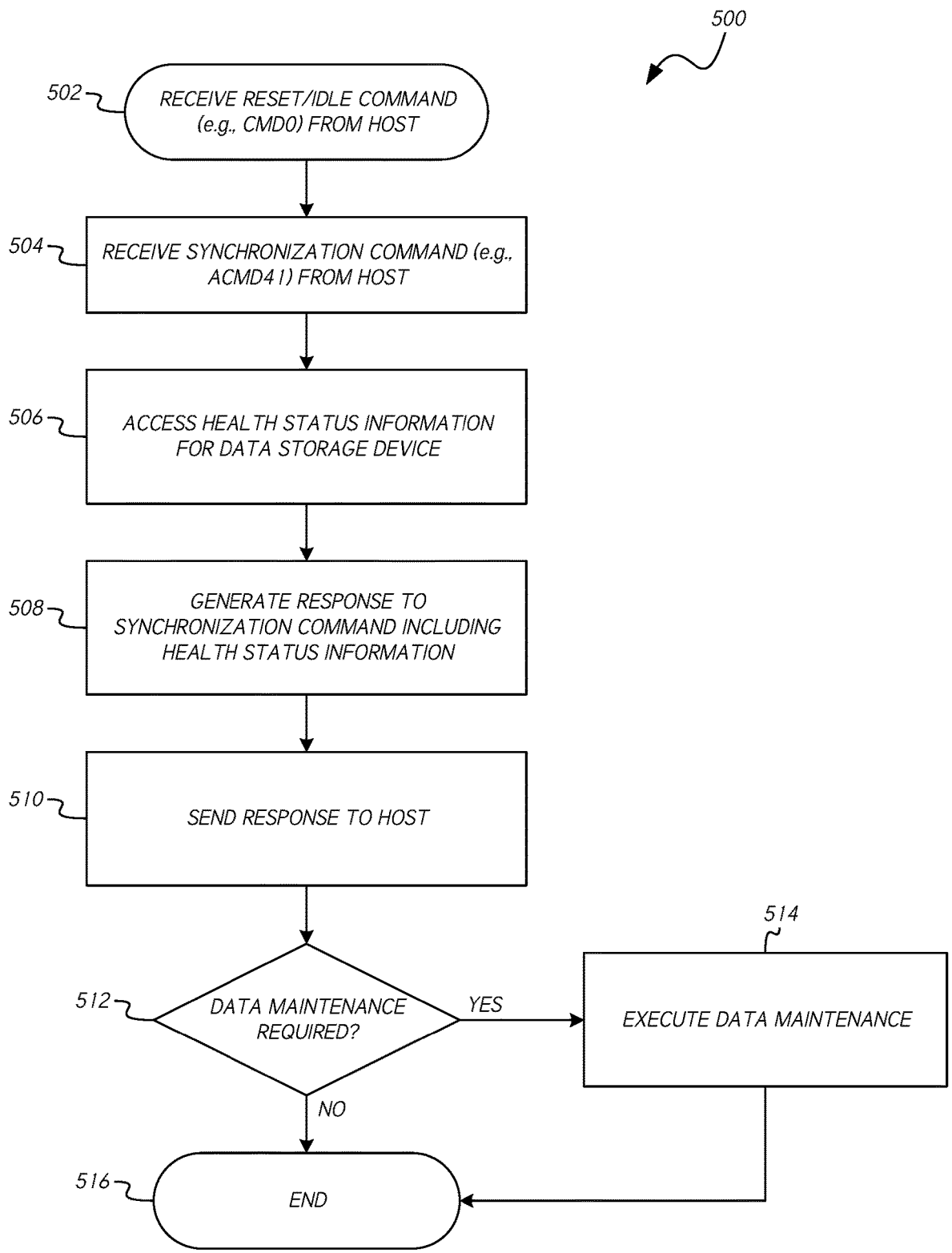
FIG. 5 is a flow diagram illustrating a process for implementing user data protection using health status information in accordance with one or more embodiments.

FIG. 5 is a flow diagram illustrating a process 500 for implementing user data protection using health status information in accordance with one or more embodiments of the present disclosure. One or more of the steps/blocks of the process 500 may be implemented or performed at least in part by a data storage device, such as by a controller or control circuitry of a data storage device. For example, the process 500 may be performed at least in part by the data storage device 120 of FIG. 1, described in detail above. At block 502, the process 500 involves a data storage device receiving a reset or idle command from a host system communicatively coupled to the data storage device. For example, when the data storage device (e.g., memory card) is connected to the host, power may be received from the host by the data storage device, and the data storage device may enter an idle state in response to an idle state entry command (e.g., CMD0).

At block 504, the process 500 involves receiving a synchronization command, such as an ACMD41 command, from the host system. At block 506, the process 500 involves accessing or otherwise determining health status information for the data storage device and/or associated media. At block 508, the process 500 involves generating a response to the synchronization command, wherein the response includes health status information embedded therein or provided therewith. At block 510, the process 500 involves sending the response to the host system.

The health status information associated with the data storage device and/or media thereof may indicate a health state requiring data maintenance with respect to the data storage media. At block 512, the process 500 involves determining whether data maintenance operations are required with respect to the data storage media based on the health status of the data storage device. If so, the process 500 may proceed to block 514, where such data maintenance operations may be executed according to the health status or state of the data storage device. At block 516, the process 500 ends.

Figure 6:
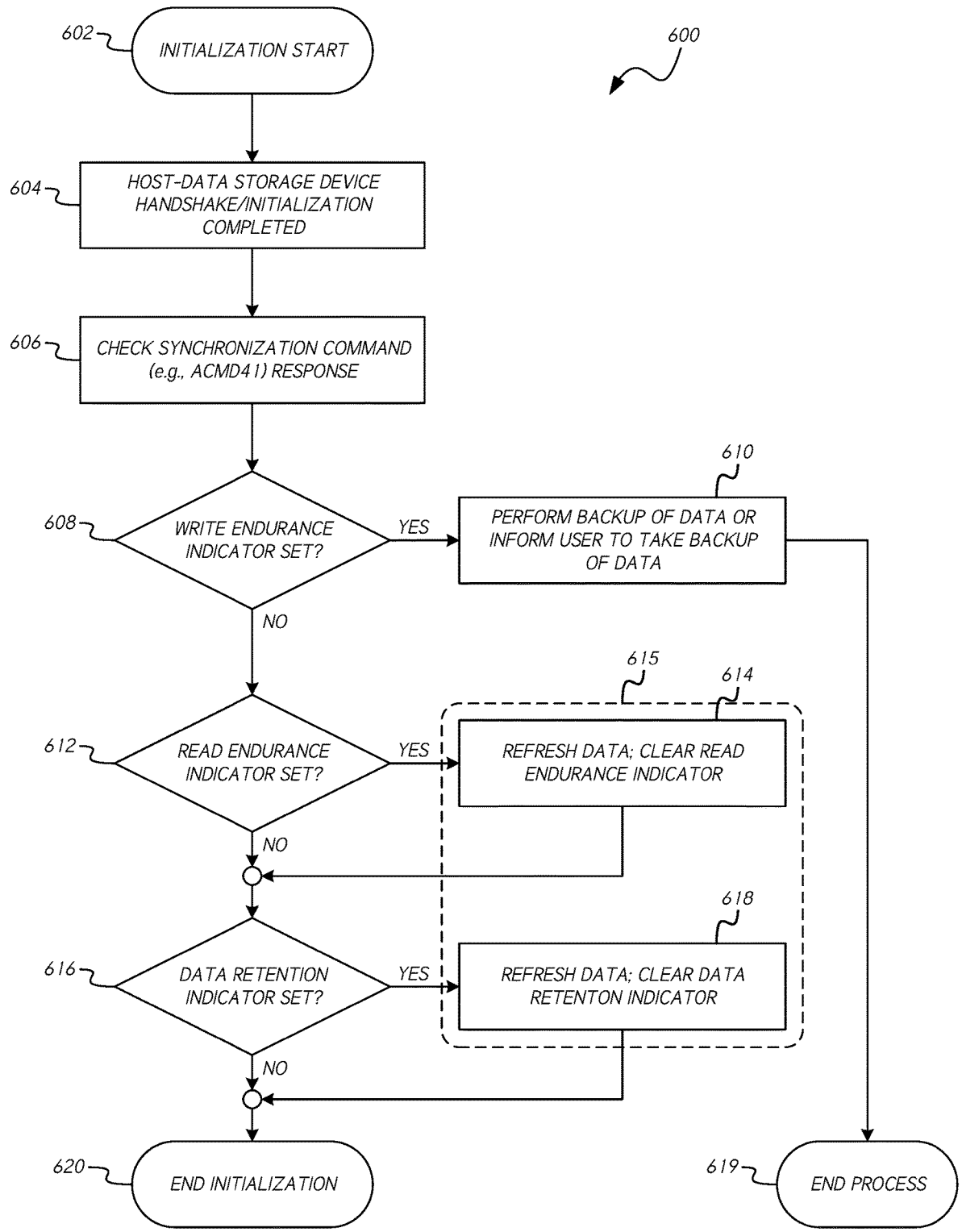
FIG. 6 is a flow diagram illustrating a process for implementing user data protection based on health status information in accordance with one or more embodiments.

FIG. 6 is a flow diagram illustrating a process 600 for implementing user data protection based on health status information in accordance with one or more embodiments of the present disclosure. One or more of the steps/blocks of the process 600 may be implemented or performed at least in part by a host computing system and/or data storage device of a data storage system, such as by one or more controllers or control circuitry of a host computing system or data storage device of a data storage system. For example, the process 600 may be performed at least in part by the host system 110 and/or data storage device 120 of the data storage system 100 of FIG. 1, described in detail above. At block 602, the process 600 involves initiating an initialization sub-process between a data storage device and a host system communicatively coupled thereto. The initialization sub-process may involve sending a command that initializes data storage device in an idle state to allow for data to be exchanged between the host and the data storage device, and further sending a synchronization command (e.g., ACMD41) to the data storage device.

At block 604, the process 600 involves completing a handshake stage of the initialization sub-process between the data storage device and the host system. For example, as part of the initialization handshake procedure, the host system may receive a response to the synchronization command from the data storage device. The response to the synchronization command may indicate that the data storage device is no longer in a busy state. Once such a response is received that indicates that the data storage device is no longer in a busy state, the handshake stage may effectively be complete. In certain embodiments, the process step at block 604 may involve re-sending synchronization commands to the data storage device until a busy bit in the response received from the data storage device is not set. The busy bit (or other value) may indicate whether the data storage device is busy performing, for example, power-up operations.

At block 606, the process 600 involves checking or inspecting the synchronization command response received from the data storage device. At block 608, the process 600 involves determining whether a write endurance indicator is set in the response to the synchronization command. For example, the write endurance indicator may comprise a bit, flag, data value/field, or the like, that is part of the response to the synchronization command, wherein a state of the indicator indicates whether write endurance is exceeded in the data storage device. If the write endurance indicator is set, the process 600 proceeds to block 610, where a backup of data may be performed by the host system and/or other action may be taken by the host system to facilitate or cause a backup of at least a portion of the user data stored in the data storage device media to another location external to the data storage device to be performed. For example, at block 610, the process 600 may involve providing a notification, or otherwise informing a user, to take a backup of data in order to preserve such data.

Once the backup or other responsive action has been implemented at block 610, the process terminates at block 619. If the write endurance indicator is not set, as determined at block 608, the process 600 proceeds to block 612, where it is determined whether a read endurance indicator is set, which may indicate that a read endurance limit of the data storage device has been met or exceeded. Where the read endurance indicator is set, certain data refreshing operations may be executed by the data storage device in order to resolve the read-endurance-related issues. The host system, in certain embodiments, may not be required to take any responsive action when it is determined that the read endurance indicator is set. In certain embodiments, where the read endurance indicator is set, the host system may provide a user notification indicating such health state with respect to read endurance.

At block 616, the process 600 involves determining whether a data retention indicator is set. If so, data may be refreshed in the data storage device. In certain embodiments, the process steps 615 may be implemented at least in part by the data storage device and/or controller circuitry thereof. When data refreshing has been implemented in the blocks 615, the respective read endurance or data retention indicators may be cleared such that subsequent health status responses by the data storage device may not indicate the respective read endurance indicator or data retention indicator. The process 600 proceeds to a block 620 where initialization of the data storage device 600 is completed, after which the data storage device may be configured to receive and store user data.

Additional Embodiments

Those skilled in the art will appreciate that in some embodiments, other types of data storage systems and/or health status management schemes can be implemented. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
   a nonvolatile memory module;
   a host communication interface configured to communicatively couple to a host system; and
   a control circuitry configured to:
   execute an initialization process with the host system; and
   as part of the initialization process,
   receive a synchronization command from the host system;
   generate a response to the synchronization command, wherein the response includes:
   health status information associated with the nonvolatile memory module; and
   information indicative of whether the data storage device has compatible operation conditions to the host system; and
   send the response to the host system using the host communication interface.

2. The data storage device of claim 1, wherein:
   the data storage device is a solid-state memory card device;
   the host communication interface comprises a plurality of contact pins configured to electrically couple to a physical connector of the host system; and
   the control circuitry is further configured to receive power from the host system using one or more of the plurality of contact pins as part of the initialization process.

3. The data storage device of claim 1, wherein the control circuitry is further configured to enter reset as part of the initialization process.

4. The data storage device of claim 1, wherein the initialization process conforms to at least one of the MultiMediaCards (MMC) standard or the Secure Digital (SD) standard.

5. The data storage device of claim 1, wherein the synchronization command is an ACMD41 command.

6. The data storage device of claim 1, wherein the control circuitry is further configured to:
   receive a reset command from the host system as part of the initialization process; and
   in response to the reset command, enter an idle state.

7. The data storage device of claim 6, wherein the reset command is a CMD0 command conforming to at least one of the MultiMediaCards (MMC) standard or the Secure Digital (SD) standard.

8. The data storage device of claim 1, wherein the control circuitry is further configured to maintain the health status information in the nonvolatile memory module.

9. The data storage device of claim 1, wherein the control circuitry is further configured to maintain the health status information in one or more non-volatile data registers.

10. The data storage device of claim 1, wherein the health status information is embedded in one or more reserved fields of the response to the synchronization command received by the data storage device from the host system.

11. The data storage device of claim 10, wherein the response to the synchronization command comprises the health status information in a health status block comprising one or more of a write endurance flag, a read endurance flag, or a data retention flag.

12. The data storage device of claim 11, wherein the response to the synchronization command further comprises the health status information in a health values block comprising one or more of a read health value or a write health value.

13. The data storage device of claim 12, wherein:
    the read health value indicates a percentage read health remaining; and
    the write health value indicates a percentage of write health remaining.

14. The data storage device of claim 1, wherein the control circuitry is further configured to:
    receive, responsive to the response comprising preselected information, a command to perform a back-up function from the host system; and
    cause, in response to the back-up command, data stored in the data storage device to be backed-up to a location external to the data storage device.

15. A method of managing data in a data storage device, the method comprising:
    by a control circuitry of a data storage device:
    executing an initialization process with a host system communicatively coupled to the data storage device using a host communication interface; and
    as part of the initialization process,
    receiving a synchronization command from the host system;
    generating a response to the synchronization command, wherein the response includes:
    health status information associated with a nonvolatile memory module of the data storage device; and
    information indicative of whether the data storage device has compatible operation conditions to the host system; and
    sending the response to the host system using the host communication interface.

16. The method of claim 15, further comprising:
as part of the initialization process:
in response to the synchronization command, determining a health status of the data storage device; and
wherein said generating the response is based on the determined health status of the data storage device.

17. The method of claim 16, further comprising, in response to said determining the health status of the data storage device, implementing a data refreshing operation in the data storage device.

18. The method of claim 15, wherein the health status information comprises data indicating one or more of:
a data storage device identifier associated with the data storage device;
write endurance data;
read endurance data; or
data retention capability data.

19. The method of claim 15, wherein the health status information indicates a percentage of available health of the data storage device.

20. The method of claim 15, wherein the health status information comprises data indicating one or more of:
read health status;
write health status;
read count;
write count;
program/erase (P/E) count;
data retention time;
temperature exposure;
data retention history; or
health history of the data storage device.

21. The method of claim 15, wherein the health status information indicates:
that an end-of-life state of the data storage device has been reached; and
a cause of failure of the data storage device.

22. A computing device comprising:
a data storage interface configured to communicatively couple the computing device to a data storage device; and
a control circuitry configured to:
initiate an initialization process with the data storage device;
send, as part of the initialization process, a synchronization command to the data storage device using the data storage interface;
receive, as part of the initialization process, a response to the synchronization command from the data storage device using the data storage interface, wherein the response includes health status information of the data storage device;
decode the health status information; and
determine a health status of the data storage device based on the health status information,
wherein the response further comprises information indicative of whether the data storage device has compatible operation conditions to the computing device.

23. The computing device of claim 22, wherein the control circuitry is further configured to implement preemptive data protection in the data storage device in response to the health status information.

24. The computing device of claim 22, wherein the control circuitry is further configured to provide a notification to a user indicating the health status.

25. The computing device of claim 22, wherein:
the control circuitry is further configured to:
determine that a write endurance indicator in the response is set; and
in response to the write endurance indicator, cause data stored in the data storage device to be backed-up to a location external to the data storage device; and
the write endurance indicator indicates whether a write endurance of the data storage device is exceeded.

26. A computing device comprising:
a data storage interface configured to communicatively couple the computing device to a data storage device; and
a control circuitry configured to:
initiate an initialization process with the data storage device;
send, as part of the initialization process, a synchronization command to the data storage device using the data storage interface;
receive, as part of the initialization process, a response to the synchronization command from the data storage device using the data storage interface, wherein the response includes health status information of the data storage device;
decode the health status information; and
determine a health status of the data storage device based on the health status information,
wherein the control circuitry is further configured to request a voltage profile of the data storage device as part of the initialization process.

27. A computing device comprising:
a data storage interface configured to communicatively couple the computing device to a data storage device; and
a control circuitry configured to:
initiate an initialization process with the data storage device;
send, as part of the initialization process, a synchronization command to the data storage device using the data storage interface;
receive, as part of the initialization process, a response to the synchronization command from the data storage device using the data storage interface, wherein the response includes health status information of the data storage device;
decode the health status information;
determine a health status of the data storage device based on the health status information;
determine that a data retention indicator in the response is set; and
in response to the data retention indicator, implement dynamic read cases in the data storage device,
wherein the data retention indicator indicates whether a data retention condition has been met.

28. A method of managing data in a data storage device, the method comprising:
initiating, by a control circuitry of a host computing system communicatively coupled to a data storage device, an initialization process with the data storage device at least in part by:
sending a synchronization command to the data storage device using a data storage interface;
receiving a response to the synchronization command from the data storage device using the data storage interface, wherein the response includes health status information of the data storage device;
decoding the health status information; and
determining a health status of the data storage device based on the health status information, wherein the response further comprises information indicative of whether the data storage device has compatible operation conditions to the host computing system.

29. The method of claim 28, further comprising:
as part of the initialization process:
providing power to the data storage device;
sending an idle state entry command to the data storage device; and
sending a voltage profile command to the data storage device.

30. The method of claim 28, further comprising determining that the data storage device has reached an end-of-life state based on the health status information.

31. A method of managing data in a data storage device, the method comprising:
initiating, by a control circuitry of a host computing system communicatively coupled to a data storage device, an initialization process with the data storage device at least in part by:
sending a synchronization command to the data storage device using a data storage interface;
receiving a response to the synchronization command from the data storage device using the data storage interface, wherein the response includes health status information of the data storage device;
decoding the health status information;
determining a health status of the data storage device based on the health status information;
determining that a read endurance indicator is set in the response to the synchronization command; and
in response to the read endurance indicator, providing a user notification indicating a health state of the data storage device.

32. A data storage device comprising:
a nonvolatile memory module;
means for communicatively coupling to a host computing device; and
means for executing an initialization process with the host computing device at least in part by:
receiving a synchronization command from the host computing device;
generating a response to the synchronization command, wherein the response includes:
health status information; and
information indicative of whether the data storage device has compatible operation conditions to the host computing device; and
providing the response to the host computing device using the means for communicatively coupling.

33. The data storage device of claim 32, wherein the means for communicatively coupling comprises a plurality of pins configured to contact a plurality of respective contacts of the host computing device.

34. The data storage device of claim 32, wherein the means for executing comprises a solid-state memory controller.

* * * * *